under 35 U.S.C. 154(b) by 1123 days.

(12) United States Patent
Doi et al.

(10) Patent No.: US 7,565,171 B2
(45) Date of Patent: Jul. 21, 2009

(54) RADIO BASE SYSTEM, TRANSMISSION DIRECTIONAL CONTROL METHOD, AND TRANSMISSION DIRECTIONAL CONTROL PROGRAM

(75) Inventors: Yoshiharu Doi, Gifu (JP); Yasutaka Ogawa, Sapporo (JP); Takeo Ohgane, Sapporo (JP)

(73) Assignees: Sanyo Electric Co., Ltd., Osaka (JP); Japan as represented by President of Hokkaido University, Hokkaido (JP)

( * ) Notice: Subject to any disclaimer, the term of this patent is extended or adjusted under 35 U.S.C. 154(b) by 1123 days.

(21) Appl. No.: 10/483,529

(22) PCT Filed: Jul. 11, 2002

(86) PCT No.: PCT/JP02/07080

§ 371 (c)(1),
(2), (4) Date: Jan. 12, 2004

(87) PCT Pub. No.: WO03/007506

PCT Pub. Date: Jan. 23, 2003

(65) Prior Publication Data
US 2004/0176136 A1    Sep. 9, 2004

(30) Foreign Application Priority Data
Jul. 12, 2001    (JP) ............................. 2001-211979

(51) Int. Cl.
*H04M 1/00* (2006.01)
*H04B 1/38* (2006.01)
(52) U.S. Cl. ...................... 455/562.1; 455/561; 455/73
(58) Field of Classification Search .............. 455/562.1, 455/561, 73
See application file for complete search history.

(56) References Cited

U.S. PATENT DOCUMENTS 6,496,778 B1 * 12/2002 Lin ............................. 701/215

FOREIGN PATENT DOCUMENTS

JP    2001-103002 A    4/2001

(Continued)

OTHER PUBLICATIONS

G.G. Raleigh et al., "Adaptive antenna transmission for frequency duplex digital wireless communication", IEEE International Conference, Jun. 8-12, 1997, Montreal, Quebec, Canada, vol. 2, pp. 641-646.

(Continued)

*Primary Examiner*—Rasha S Al Aubaidi
(74) *Attorney, Agent, or Firm*—McDermott Will & Emery LLP

(57) ABSTRACT

A radio unit (2000) separates a signal from a specific terminal among signals from array antennas (#1-#4) based on a reception weight vector calculated by a reception weight vector calculator (20). A reception response vector calculator (22) derives a reception response vector of a propagation path for the signal from the specific terminal. A transmission response vector estimator (40) regards an estimation result of the reception response vector calculator (22) as a composite waveform of a function of a plurality of frequencies, determined in accordance with a Doppler frequency, and predicts a transmission response vector at a time point of transmission by obtaining coefficients of respective function. A transmission weight vector calculator (30) controls antenna directivity in transmission, based on a prediction result of the transmission response vector estimator (40).

24 Claims, 7 Drawing Sheets

FOREIGN PATENT DOCUMENTS

JP          2001-148650          5/2001

OTHER PUBLICATIONS

C. Bontu et al., "Diversity Transmission and Adaptive MLSE for Digital Cellular Radio", IEEE Transactions on Vehicular Technology, vol. 48, No. 5, Sep. 1999, pp. 1488-1502.

H. Cirpan et al., "Maximum Likelihood Blind Channel Estimation in the Presence of Doppler Shifts", IEEE Transactions on Signal Processing, vol. 47, No. 6, Jun. 1999, pp. 1559-1569.

Y. Kishiyama et al., "Weight estimation for down-link null forming in TDD/SDMA system", The Institute of Electronics, Technical Report of IEICE, CS99-44, RCS99-36 (Jun. 1999), pp. 67-72.

N. Kikuma, "Chapter 3: MMSE Adaptive Array", in "Adaptive Signal Processing by Array Antenna", (Partial English Translation), pp. 35-49.

* cited by examiner

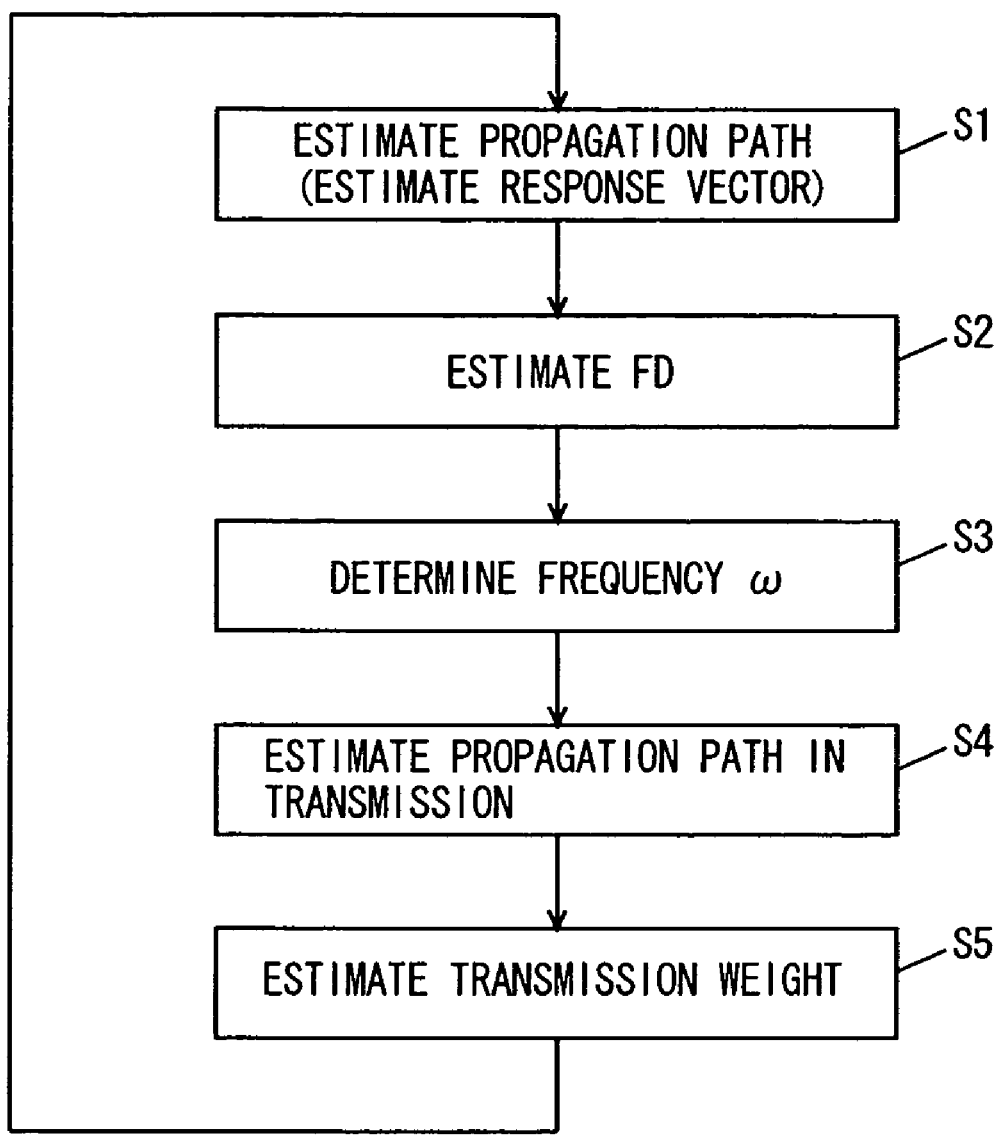
F I G. 3

F I G. 5
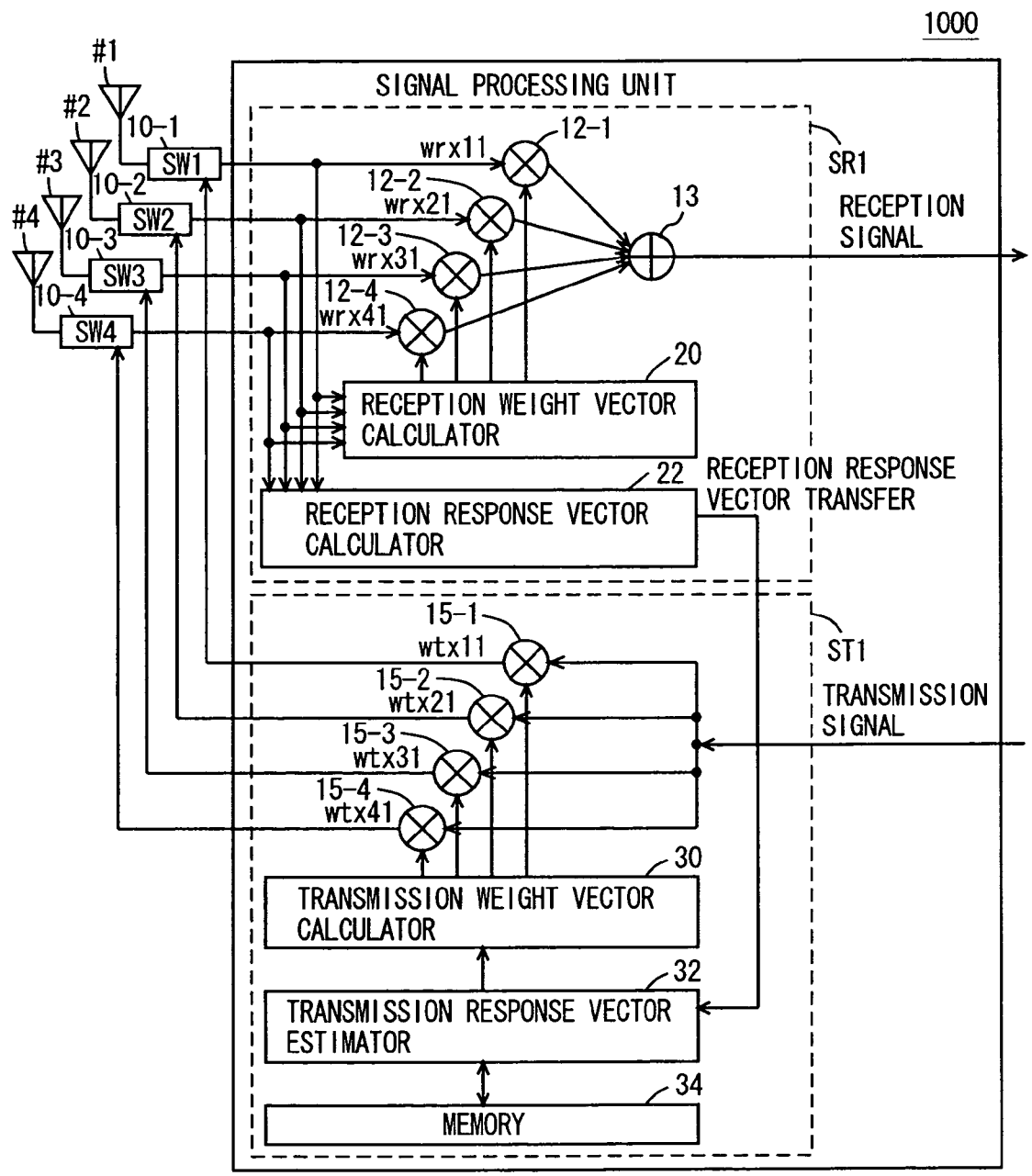

F I G. 6
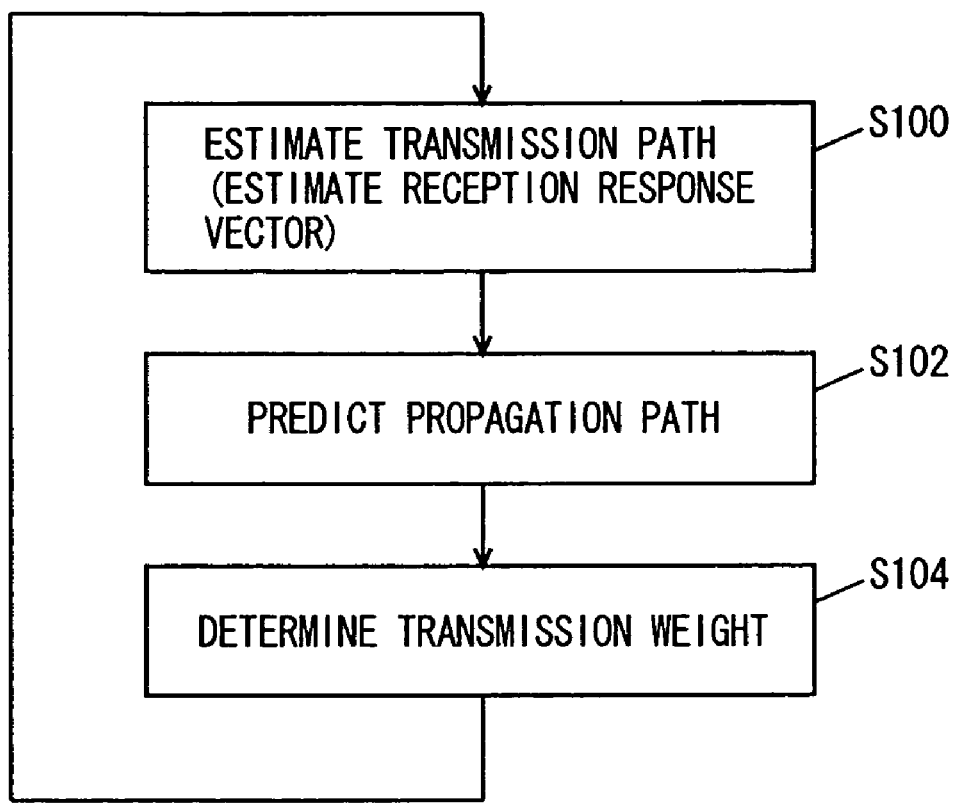

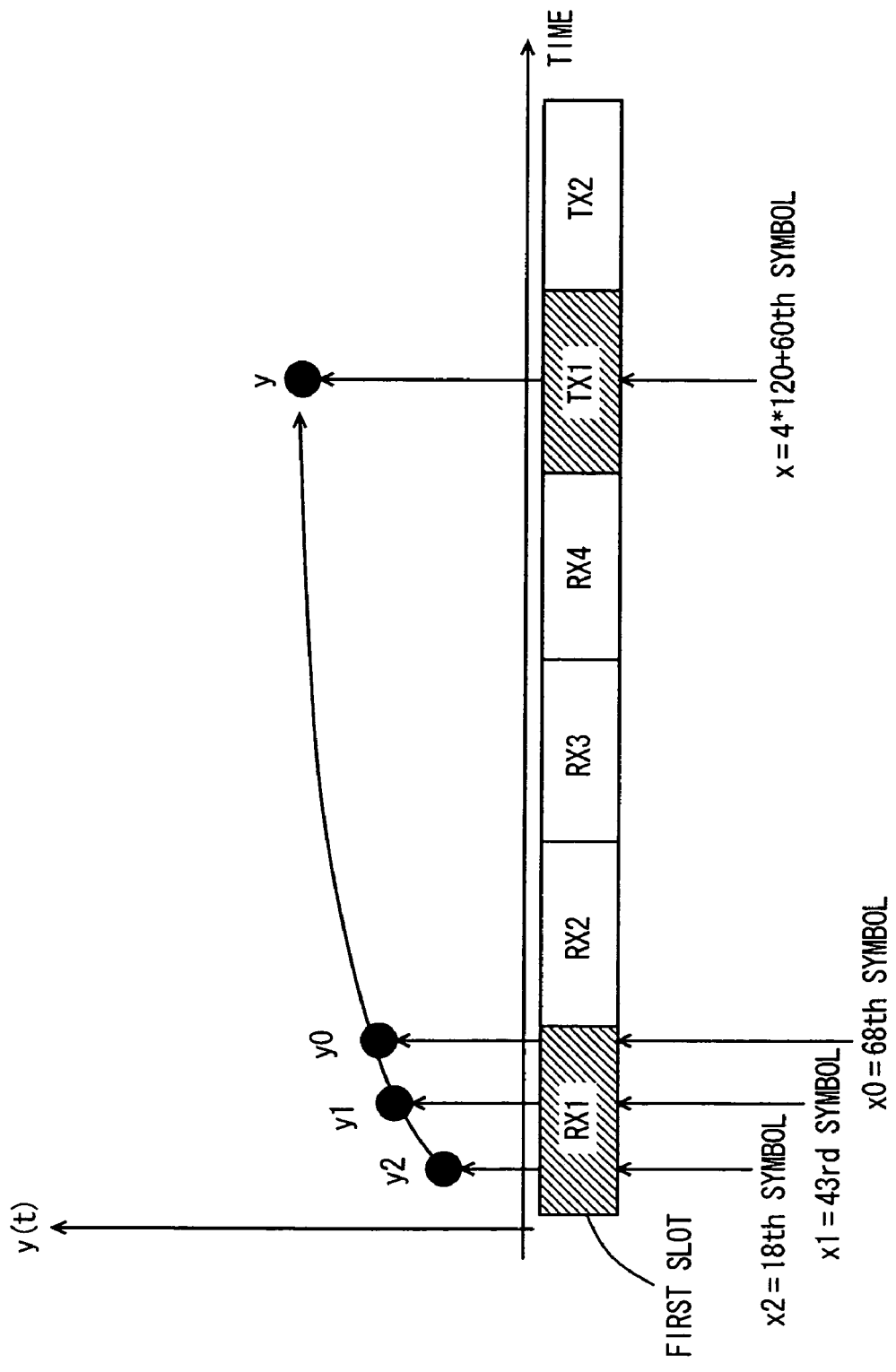

RADIO BASE SYSTEM, TRANSMISSION DIRECTIONAL CONTROL METHOD, AND TRANSMISSION DIRECTIONAL CONTROL PROGRAM

TECHNICAL FIELD

The present invention relates to a radio base station system as well as a method and a program for controlling transmission directivity, and more particularly to a radio base station system in which directivity of an array antenna is modified in real time so that signals are transmitted/received to/from a plurality of mobile terminals in a mobile communication system, as well as a method and a program for controlling transmission directivity in such a radio base station system.

BACKGROUND ART

Recently, in a rapidly-developing mobile communication system (for example, Personal Handyphone System: hereinafter, referred to as "PHS"), in communication between a radio base station system (a base station) and a mobile terminal (a terminal), a scheme for separating and extracting a reception signal from a specific terminal with an adaptive array processing on a side of a base station, among a plurality of terminals that have established spatial multiple access to the base station, has been proposed.

The adaptive array processing is a well-known processing, in which, based on signals received from a plurality of terminals by an array antenna of the base station, a reception weight vector consisting of weights for respective antennas constituting the array antenna is calculated and adaptively controlled, thereby accurately extracting a signal from a specific terminal.

In the base station, a reception weight vector calculator calculating such a reception weight vector for each symbol in the reception signal is provided. The reception weight vector calculator performs a processing to converge the reception weight vector so as to reduce a mean square of an error between the sum of complex multiplication of the reception signal by a calculated reception weight vector and a known reference signal, that is, the adaptive array processing to converge reception directivity from the specific terminal.

In the adaptive array processing, the reception weight vector is adaptively converged in accordance with time and fluctuation of a property of a propagation path for a signal radio wave, so that an interfering component or noise is eliminated from the reception signal, to extract the reception signal from the specific terminal.

On the other hand, in the base station, a transmission weight vector calculator calculating a transmission weight vector for each symbol in a transmission signal is provided. The transmission signal weighted with the transmission weight vector calculated by the transmission weight vector calculator is transmitted with the same array antenna as in reception.

Here, if the transmission weight vector calculator duplicates the reception weight vector as it is for use as the transmission weight vector, the transmission signal is weighted to target the same, specific terminal as in reception. In such a case, a transmitted radio wave signal is emitted as if it had transmission directivity to that terminal.

In contrast, there is a time interval from when the radio wave is transmitted from the specific terminal to the base station through an uplink until when the radio wave is transmitted from the base station to the terminal through a downlink. When the reception weight vector obtained in the uplink is used as it is in the downlink as the transmission weight vector as described above, and if a moving speed of the terminal is not negligible, there will be an error between a direction of emission of the radio wave from the base station and a direction in which the terminal is actually present. This will lead to deterioration of transmission directivity from the base station in the downlink.

As a method of calculating a transmission weight vector for a downlink, taking into account fluctuation in a propagation environment (fading) mainly due to travel of the terminal, a method with which a transmission response (coefficient) vector in the downlink is estimated with a extrapolation processing using a reception response (coefficient) vector obtained in the uplink, and the transmission weight vector is calculated based on the estimated transmission response vector, has been proposed.

In other words, the reception response vector is measured at a plurality of timings in the uplink in a frame, and based on the measurement value, a time waveform of the reception response vector is subjected to multiple-order extrapolation (for example, first-order extrapolation or second-order extrapolation). Then, the reception response vector at an arbitrary transmission timing in the downlink is estimated, and this will serve as the transmission response vector. The transmission weight vector is thus calculated.

With such a method, in a state where a Doppler frequency (hereinafter, represented as "FD") in proportion to the moving speed of the terminal (representing a degree of fading) is approximately up to 40 Hz, spatial multiple access of terminals of two users to the base station can be maintained. The fact that spatial multiple access can be maintained up to FD=40 Hz is disclosed, for example, in "Weight estimation for down-link null forming TDD/SDMA system," Technical Report of IEICE, (CS99-44, RCS99-36, June, 1999).

With the method using the extrapolation processing as described above, however, if the moving speed of the terminal is increased, and the time waveform of the reception response vector abruptly fluctuates with a cycle being short, an extrapolation result will considerably deviate from an actual time waveform of the reception response vector, and an extrapolation error will be large.

In particular, if the Doppler frequency representing the moving speed of the terminal exceeds FD=40 Hz, spatial multiple access can no longer be maintained.

The present invention was made to solve the above-described problems. An object of the present invention is to provide a radio base station system, as well as a method and a program for controlling transmission directivity, with which a transmission response vector in a downlink can accurately be estimated, and transmission directivity can sufficiently be controlled, even if the moving speed of the terminal is increased, and the Doppler frequency is raised.

DISCLOSER OF THE INVENTION

According to one aspect of the present invention, a radio base station system transmitting/receiving signals to/from a plurality of terminals using a plurality of antennas arranged in a discrete manner, includes reception signal separation means, reception response vector estimation means, transmission response vector estimation means, and transmission directivity control means. The reception signal separation means calculates a weight vector for separating a signal from a specific terminal among the plurality of terminals, based on signals received with the plurality of antennas. The reception response vector estimation means estimates a reception response vector of a propagation path from the specific terminal, based on signals received with the plurality of antennas. The transmission response vector estimation means estimates a transmission response vector of the propagation path in transmission, based on an estimation result of the reception response vector estimation means. The transmission directivity control means controls transmission directivity of the antennas, based on an estimation result of the transmission response vector estimation means.

The transmission response vector estimation means includes vector prediction means which regards a function of temporal change of an element for each antenna of the reception response vector estimated by the reception response vector estimation means, as a composite waveform of signal waveforms of a prescribed number of prescribed frequency components which are different from each other, predicts temporal changes at arbitrary timing positions in transmission, of the signal waveforms of respective frequency components, and synthesizes the transmission response vector.

Preferably, the vector prediction means includes coefficient estimation means and calculation means. The coefficient estimation means estimates coefficients of the signal waveforms of the respective frequency components. The calculation means calculates the transmission response vector at the arbitrary timing position in transmission, based on the estimated coefficients and the prescribed frequency components.

Preferably, the radio base station system further includes moving speed detecting means detecting a Doppler frequency representing a moving speed of the terminal. The coefficient estimation means determines the prescribed frequency components which are different from each other, in accordance with the detected Doppler frequency.

Preferably, the coefficient estimation means determines the prescribed frequency components which are different from each other so as to have a prescribed relation with a maximum value for the detected Doppler frequency.

Preferably, the transmission directivity control means controls transmission directivity of the antenna, based on the weight vector calculated by the reception signal separation means instead of the estimation result of the transmission response vector estimation means, when the detected Doppler frequency takes a value within a range indicating that the terminal has hardly moved.

Preferably, the coefficient estimation means estimates the coefficients by solving simultaneous equations having the coefficients as unknown quantity, obtained by estimating the reception response vector at timing positions in a number at least equal to that of the frequency components which are different from each other.

Preferably, transmission and reception of the signal is performed in a time-divided manner in a plurality of time slots respectively. The coefficient estimation means sets a timing position estimating the reception response vector in any one of the plurality of time slots for reception.

Preferably, transmission and reception of the signal is performed in a time-divided manner in a plurality of time slots respectively. The coefficient estimation means distributes and sets timing positions estimating the reception response vector in at least two slots among the plurality of time slots for reception.

According to another aspect of the present invention, a method of controlling transmission directivity in a radio base station system transmitting/receiving signals to/from a plurality of terminals using a plurality of antennas arranged in a discrete manner, includes the steps of: calculating a weight vector for separating a signal from a specific terminal among the plurality of terminals, based on signals received With the plurality of antennas; estimating a reception response vector of a propagation path from the specific terminal, based on signals received with the plurality of antennas; estimating a transmission response vector of the propagation path in transmission, based on the estimated reception response vector; and controlling transmission directivity of the antennas, based on the estimated transmission response vector.

The step of estimating the transmission response vector includes the steps of: regarding a function of temporal change of an element of each antenna of the estimated reception response vector as a composite waveform of signal waveforms of a prescribed number of prescribed frequency components which are different from each other; predicting temporal changes at arbitrary timing positions in transmission, of the signal waveforms of respective frequency components; and synthesizing the transmission response vector.

Preferably, the step of synthesizing includes the steps of estimating coefficients of the signal waveform of the respective frequency components, and calculating the transmission response vector at the arbitrary timing position in transmission, based on the estimated coefficients and the prescribed frequency components.

Preferably, the method of controlling transmission directivity further includes the step of detecting a Doppler frequency representing a moving speed of the terminal. The step of estimating the coefficient includes the step of determining the prescribed frequency components which are different from each other, in accordance with the detected Doppler frequency.

Preferably, the step of estimating the coefficient includes the step of determining the prescribed frequency components which are different from each other so as to have a prescribed relation with a maximum value for the detected Doppler frequency.

Preferably, the step of controlling transmission directivity of the antenna includes the step of controlling transmission directivity of the antenna, based on the calculated weight vector instead of the estimated transmission response vector, when the detected Doppler frequency takes a value within a range indicating that the terminal has hardly moved.

Preferably, the step of estimating the coefficient includes the step of estimating the coefficients by solving simultaneous equations having the coefficients as unknown quantity, obtained by estimating the reception response vector at timing positions in a number at least equal to a number of the frequency components which are different from each other.

Preferably, transmission and reception of the signal is performed in a time-divided manner in a plurality of time slots respectively. In the step of estimating the coefficient, a timing position estimating the reception response vector is set in any one of the plurality of time slots for reception.

Preferably, transmission and reception of the signal is performed in a time-divided manner in a plurality of time slots respectively. In the step of estimating the coefficient, timing positions estimating the reception response vector are distributed and set in at least two slots among the plurality of time slots for reception.

According to yet another aspect of the present invention, a program for controlling transmission directivity in a radio base station system transmitting/receiving signals to/from a plurality of terminals using a plurality of antennas arranged in a discrete manner, causes a computer to execute the steps of: calculating a weight vector for separating a signal from a specific terminal among the plurality of terminals, based on signals received with the plurality of antennas; estimating a reception response vector of a propagation path from the specific terminal, based on signals received with the plurality of antennas; estimating a transmission response vector of the propagation path in transmission, based on the estimated reception response vector; and controlling transmission directivity of the antennas, based on the estimated transmission response vector.

The step of estimating the transmission response vector includes the steps of: regarding a function of temporal change of an element of each antenna of the estimated reception response vector as a composite waveform of signal waveforms of a prescribed number of prescribed frequency components which are different from each other; predicting temporal changes at arbitrary timing positions in transmission, of the signal waveforms of respective frequency components; and synthesizing the transmission response vector.

Preferably, the step of synthesizing includes the steps of estimating coefficients of the signal waveforms of the respective frequency components, and calculating the transmission response vector at the arbitrary timing position in transmission, based on the estimated coefficients and the prescribed frequency components.

Preferably, the program for controlling transmission directivity further causes the computer to execute the step of detecting a Doppler frequency representing a moving speed of the terminal. The step of estimating the coefficient includes the step of determining the prescribed frequency components which are different from each other, in accordance with the detected Doppler frequency.

Preferably, the step of estimating the coefficient includes the step of determining the prescribed frequency components which are different from each other so as to have a prescribed relation with a maximum value for the detected Doppler frequency.

Preferably, the step of controlling transmission directivity of the antenna includes the step of controlling transmission directivity of the antenna, based on the calculated weight vector instead of the estimated transmission response vector, when the detected Doppler frequency takes a value within a range indicating that the terminal has hardly moved.

Preferably, the step of estimating the coefficient includes the step of estimating the coefficients by solving simultaneous equations having the coefficients as unknown quantity, obtained by estimating the reception response vector at timing positions in a number at least equal to a number of the frequency components which are different from each other.

Preferably, transmission and reception of the signal is performed in a time-divided manner in a plurality of time slots respectively. In the step of estimating the coefficient, a timing position estimating the reception response vector is set in any one of the plurality of time slots for reception.

Preferably, transmission and reception of the signal is performed in a time-divided manner in a plurality of time slots respectively. In the step of estimating the coefficient, timing positions estimating the reception response vector are distributed and set in at least two slots among the plurality of time slots for reception.

As described above, according to the present invention, attention is paid to the fact that temporal change of the reception response vector due to change in the propagation environment is represented as a composite of signal waveforms of a plurality of frequencies. Change in transmission for each of a prescribed number of prescribed frequency components which are different from each other is predicted and combined, whereby the reception response vector at that time is estimated and used for controlling transmission directivity in the radio base station system. Therefore, compared to an example in which the reception response vector in transmission is estimated with the extrapolation processing, more accurate control of transmission directivity can be achieved. In particular, even if the terminal moves with a high speed, and the Doppler frequency is high, spatial multiple access of a plurality of terminals to the radio base station system can be maintained.

BRIEF DESCRIPTION OF THE DRAWINGS

FIG. 3 is a flowchart illustrating a basic operation in controlling transmission directivity in the radio base station system in FIG. 1.

FIG. 5 is a functional block diagram showing a configuration of a radio base station system for performing a conventional processing for estimating a transmission response vector.

FIG. 6 is a flowchart illustrating a conventional, basic operation in controlling transmission directivity in the radio base station system in FIG. 5.

FIG. 7 is a conceptual view illustrating an estimation principle of a transmission response vector with a conventional extrapolation processing.

BEST MODES FOR CARRYING OUT THE INVENTION

Figure 1:
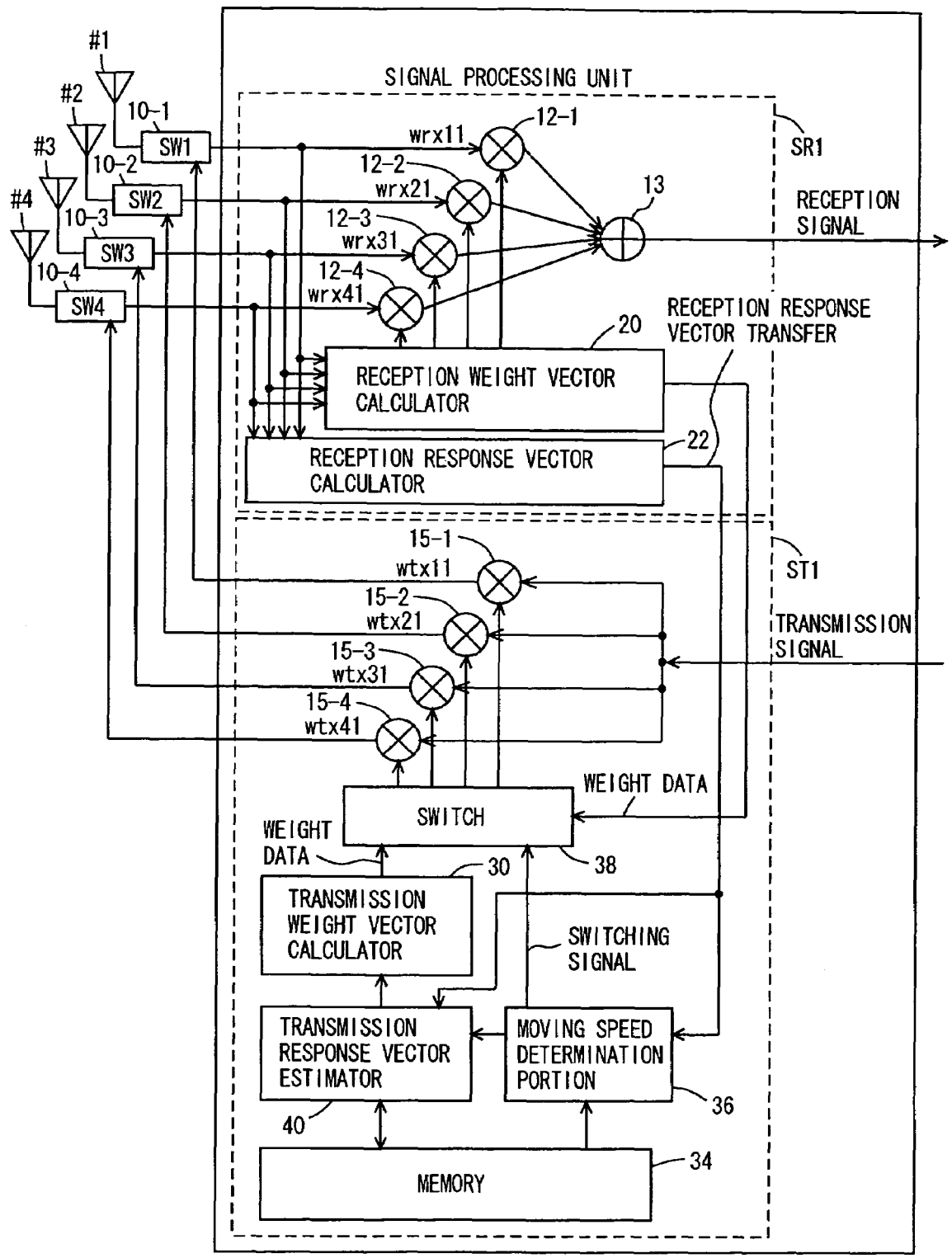
FIG. 1 is a functional block diagram showing a configuration of a radio base station system according to the embodiment of the present invention.

In the following, embodiments of the present invention will be described in detail with reference to the figures. It is noted that the same reference characters refer to the same or corresponding components in the figures, and description therefor will not be repeated.

Before describing the embodiment of the present invention, estimation of a transmission response vector using a conventional extrapolation processing, as well as control of transmission directivity in the base station will initially be described.

FIG. 5 is a functional block diagram for functionally illustrating a configuration of a base station 1000 for estimating a transmission response vector with the conventional extrapolation processing performed with software by a digital signal processor (DSP).

In the configuration shown in FIG. 5, in order to identify two users PS1 and PS2, four antennas #1 to #4 are provided. Here, more generally, N antennas (N: natural number) may be provided.

In base station 1000 shown in FIG. 5, a reception portion SR1 for separating a signal of a corresponding user, for example, user PS1, upon receiving signals from antennas #1 to #4, and a transmission portion ST1 for transmitting a signal to user PS1 are provided. Connection of antennas #1 to #4 to reception portion SR1 and transmission portion ST1 can selectively be switched by switches 10-1 to 10-4.

Here, reception signals $RX_1(t)$, $RX_2(t)$, $RX_3(t)$, $RX_4(t)$ received at antennas #1 to #4 respectively are represented in the following equations.

$$RX_1(t)=h_{11}Srx_1(t)+h_{12}Srx_2(t)+n_1(t)$$

$$RX_2(t)=h_{21}Srx_1(t)+h_{22}Srx_2(t)+n_2(t)$$

$RX_3(t)=h_{31}Srx_1(t)+h_{32}Srx_2(t)+n_3(t)$ $RX_4(t)=h_{41}Srx_1(t)+h_{42}Srx_2(t)+n_4(t)$

Here, signals $Srx_1(t)$ and $Srx_2(t)$ represent signals transmitted from user PS1 and user PS2 respectively, coefficients $h_{11}$, $h_{21}$, $h_{31}$, $h_{41}$ represent complex coefficients of the signal from user PS1 received at antennas #1 to #4 respectively, and coefficients $h_{12}$, $h_{22}$, $h_{32}$, $h_{42}$ represent complex coefficients of the signal from user PS2 received at antennas #1 to #4 respectively. Here, $n_1(t)$, $n_2(t)$, $n_3(t)$, $n_4(t)$ represent noise components contained in signals received at antennas #1 to #4 respectively.

The above reception signals $RX_1(t)$, $RX_2(t)$, $RX_3(t)$, $RX_4(t)$ received at antennas #1 to #4 respectively enter reception portion SR1 through corresponding switches 10-1, 10-2, 10-3, 10-4, and are provided to reception weight vector calculator 20, reception response vector calculator 22 as well as to one inputs of corresponding multipliers 12-1, 12-2, 12-3, 12-4.

Weight coefficients wrx11, wrx 21, wrx31, wrx 41 with respect to the reception signal at respective antennas are applied to the other inputs of these multipliers from reception weight vector calculator 20. These weight coefficients are calculated in real time by reception weight vector calculator 20.

Reception weight vector calculator 20 uses an adaptive array algorithm such as RLS (Recursive Least Squares) algorithm or SMI (Sample Matrix Inversion) algorithm, to calculate the reception weight vector consisting of these weight coefficients.

Such RLS algorithm and SMI algorithm are well-known techniques in the field of adaptive array processing, and described in detail, for example, in Nobuyoshi Kikuma, "Adaptive Signal Processing with Array Antenna", Science Press, Inc., p.35-p.49, chapter 3, "MMSE Adaptive Array". Therefore, description thereof will not be provided.

Reception response vector calculator 22 in FIG. 5, upon receiving reception signals $RX_1(t)$, $RX_2(t)$, $RX_3(t)$, $RX_4(t)$ in the above equations, calculates and outputs a reception response (coefficient) vector $H_1=[h_{11}, h_{21}, h_{31}, h_{41}]$ consisting of elements (coefficients) $h_{11}$, $h_{21}$, $h_{31}$, $h_{41}$ for four antennas in the signal transmitted from user PS1, and a reception response vector $H_2=[h_{12}, h_{22}, h_{32}, h_{42}]$ consisting of elements (coefficients) $h_{12}$, $h_{22}$, $h_{32}$, $h_{42}$ for four antennas in the signal transmitted from user PS2.

A basic operation of such reception response vector calculator 22 shown in FIG. 5 is well-known, and described in detail, for example, in International Publication No. WO 00/79702, which is commonly assigned. Therefore, description therefor will not be provided.

On the other hand, transmission portion ST1 includes a transmission response vector estimator 32 finding a transmission response (coefficient) vector by estimating a propagation path in transmission, that is, estimating an imaginary reception response vector at a time point of transmission, upon receiving the reception response vector calculated in reception response vector calculator 22, as described later; a memory 34 communicating data with transmission response vector estimator 32, and storing and holding the data; a transmission weight vector calculator 30 calculating a transmission weight vector based on an estimation result of transmission response vector estimator 32; and multipliers 15-1, 15-2, 15-3, 15-4 receiving a transmission signal at one input respectively, and having weight coefficients wtx11, wtx21, wtx31, wtx41 from transmission weight vector calculator 30 applied to the other input. Outputs from multipliers 15-1, 15-2, 15-3, 15-4 are provided to antennas #1 to #4 via switches 10-1 to 10-4.

Though not shown in FIG. 1, components similar to reception portion SR1 and transmission portion ST1 are provided for each user.

FIG. 6 is a flowchart for illustrating an outline of a basic operation of base station 1000 in FIG. 5, adopting the conventional extrapolation processing.

In base station 1000, attention is paid to the fact that the weight vector (the weight coefficient vector) of the adaptive array can uniquely be represented by a response vector at each antenna element. The transmission weight vector is indirectly estimated by estimating temporal fluctuation of the reception response vector with the above-described extrapolation processing until a time point of transmission.

First, in reception portion SR1, the propagation path for the reception signal is estimated based on the reception signal (step S100). In other words, if reception response vector $H_1$ can be estimated by reception response vector calculator 22, for example, the propagation path in receiving the signal from user PS1 can be estimated.

In succession, transmission response vector estimator 32 predicts the propagation path in transmission, that is, predicts the reception response vector at the time point of transmission based on the reception response vector in reception, using the conventional extrapolation processing described below (step S102). The predicted reception response vector is comparable to the transmission response vector in transmission.

In addition, transmission weight vector calculator 30 uses an algorithm such as Wiener solution, to calculate the transmission weight vector based on the estimated transmission response vector, for output to multipliers 15-1 to 15-4 (step S104). A calculation principle of the transmission weight vector is well-known, and described in detail, for example, in International Publication No. WO 00/79702, which is commonly assigned. Therefore, description therefor will not be provided.

FIG. 7 is a conceptual view for illustrating a basic operation of transmission response vector estimator 32 shown in FIG. 5, that is, estimation of the transmission response vector with the conventional extrapolation processing. In FIG. 7, a frame configuration consisting of 8 slots, that is, a configuration in which 4 users are assigned to the uplink and the downlink respectively, is assumed. In other words, the uplink is constituted with four reception slots RX1, RX2, RX3 and RX4, while the downlink is constituted with four transmission slots TX1, TX2, not-shown TX3 and TX4. It is to be noted that one slot has 120 symbols.

In an example in FIG. 7, transmission response vector estimator 32 receives from reception response vector calculator 22, a measurement value of the reception response vector at three points in the first slot RX1 among four slots in reception (uplink), and stores the result in memory 34. Then, transmission response vector estimator 32 estimates the reception response vector in the first slot TX1 among four slots in transmission (downlink) with the extrapolation processing based on the measurement value.

More specifically, in FIG. 7, the abscissa represents the time base, while the ordinate represents the reception response vector. The reception response vector measured at a timing x2 (18th symbol) corresponding to the front edge of the first slot RX1 in the uplink is represented as y2; the reception response vector measured at a timing x1 (43rd symbol) corresponding to the center portion of that slot RX1 is represented as y1; and the reception response vector measured at a timing x0 (68th symbol) corresponding to the rear edge of that slot RX1 is represented as y0.

When a reception response vector y(t) at time t is estimated from reception response vectors y0, y1, y2 at these three points x0, x1, x2, for example, with second-order extrapolation, y(t) is expressed in the following equation.

$$y(t)=y0+(x-x0)(y0-y1)/(x0-x1)+(x-x0)(x-x1)\{(y0-y1)-(y1-y2)\}/\{2(x0-x1)(x1-x2)\} \quad (1)$$

Here, reception response vector y(t), for example, at timing x at 60th symbol in the first slot TX1 in the downlink, that is, at 540th symbol from the beginning of that frame, can be obtained in the following equation, by substituting x0=68, x1=43, x2=18 and x=540 in the above equation (1).

$$y(t) = y0 + \{472/25\}(y0-y1) + \{472/25\}\{497/25\} \quad (2)$$
$$\{(y0-y1)-(y1-y2)\}/2$$
$$= \{1+472/25+(472*497)/(25*25*2)\}y0 - \{472/25 + (472*497)/(25*25)\}y1 + (472*497)/(25*25*2)y2$$
$$= 207.5472 y0 - 394.2144 y1 + 187.6672 y2$$

Transmission weight vector calculator 30 in FIG. 5 calculates the transmission weight vector using the algorithm such as Wiener solution, based on transmission response vector y(t) estimated through second-order extrapolation in this manner. Transmission directivity is thus controlled.

As described before, however, with the method using such extrapolation processing, if the moving speed of the terminal is increased (fading is more significant), and if the time waveform of the reception response vector fluctuates more significantly, the extrapolation error may be large. In particular, if FD exceeds approximately 40Hz, the base station can no longer maintain spatial multiple access.

Therefore, the present invention aims to implement correct transmission directivity even in an environment where the Doppler frequency FD is high, by accurately estimating the reception response vector at a timing of the downlink without using the extrapolation processing.

FIG. 1 is a functional block diagram for functionally illustrating a configuration of a base station 2000 according to the embodiment of the present invention, performed with software by the DSP.

Base station 2000 shown in FIG. 1 is different from base station 1000 shown in FIG. 5 in the following points. The reception response vector supplied from reception response vector calculator 22 is provided to a transmission response vector estimator 40 as well as to a moving speed determination portion 36.

Moving speed determination portion 36 detects the Doppler frequency FD corresponding to the moving speed of the terminal, from the provided reception response vector. The detected FD is provided to transmission response vector estimator 40. In addition, moving speed determination portion 36 generates a switching signal based on a value of the detected FD, and provides the signal to a switch control input of a switch 38.

A determination principle by moving speed determination portion 36 will now be described. As described above, a propagation environment of the propagation path is represented in accordance with fluctuation of the reception coefficient of the propagation path, that is, the degree of fading. The degree of fading is represented as a physical value with the Doppler frequency FD.

The Doppler frequency FD in the propagation environment is estimated in the following manner, for example. A correlation value of two reception response vectors arriving at different time, of the reception signal for each user, separated by the adaptive array processing, is calculated. Without fading, two reception response vectors will match, and the correlation value will attain 1. On the other hand, if the fading is significant, a difference between reception response vectors will be large, and the correlation value will be smaller.

When a relation between the correlation value of the reception response vectors and the Doppler frequency FD is experimentally found in advance and held in memory 34, moving speed determination portion 36 can estimate the Doppler frequency FD at that time by calculating the correlation value of the reception response vectors.

Transmission response vector estimator 40 estimates the transmission response vector in accordance with the estimation principle of the present invention described later, based on the provided reception response vector and the Doppler frequency FD.

Transmission weight vector calculator 30 calculates the transmission weight vector using the well-known algorithm such as Wiener solution, based on the estimated transmission response vector.

Switch 38 has its one input provided with the reception weight vector calculated by reception weight vector calculator 20, and has the other input provided with the transmission weight vector calculated by transmission weight vector calculator 30.

A switching signal selecting the reception weight vector from reception weight vector calculator 20 when the Doppler frequency FD is determined as lower than approximately 10 Hz, and selecting the transmission weight vector from transmission weight vector calculator 30 when it is determined as higher than approximately 10 Hz, is provided to a switch control input of switch 38 from moving speed determination portion 36.

The weight vector selected by switch 38 is provided to one inputs of multipliers 15-1, 15-2, 15-3, 15-4 respectively. Configuration and operation of other portion in base station 2000 shown in FIG. 1 are similar to those in base station 1000 shown in FIG. 5, and description therefor will not be repeated.

Next, the estimation principle of the transmission response vector according to the present invention, performed in transmission response vector estimator 40 in FIG. 1 will be described.

Figure 2:
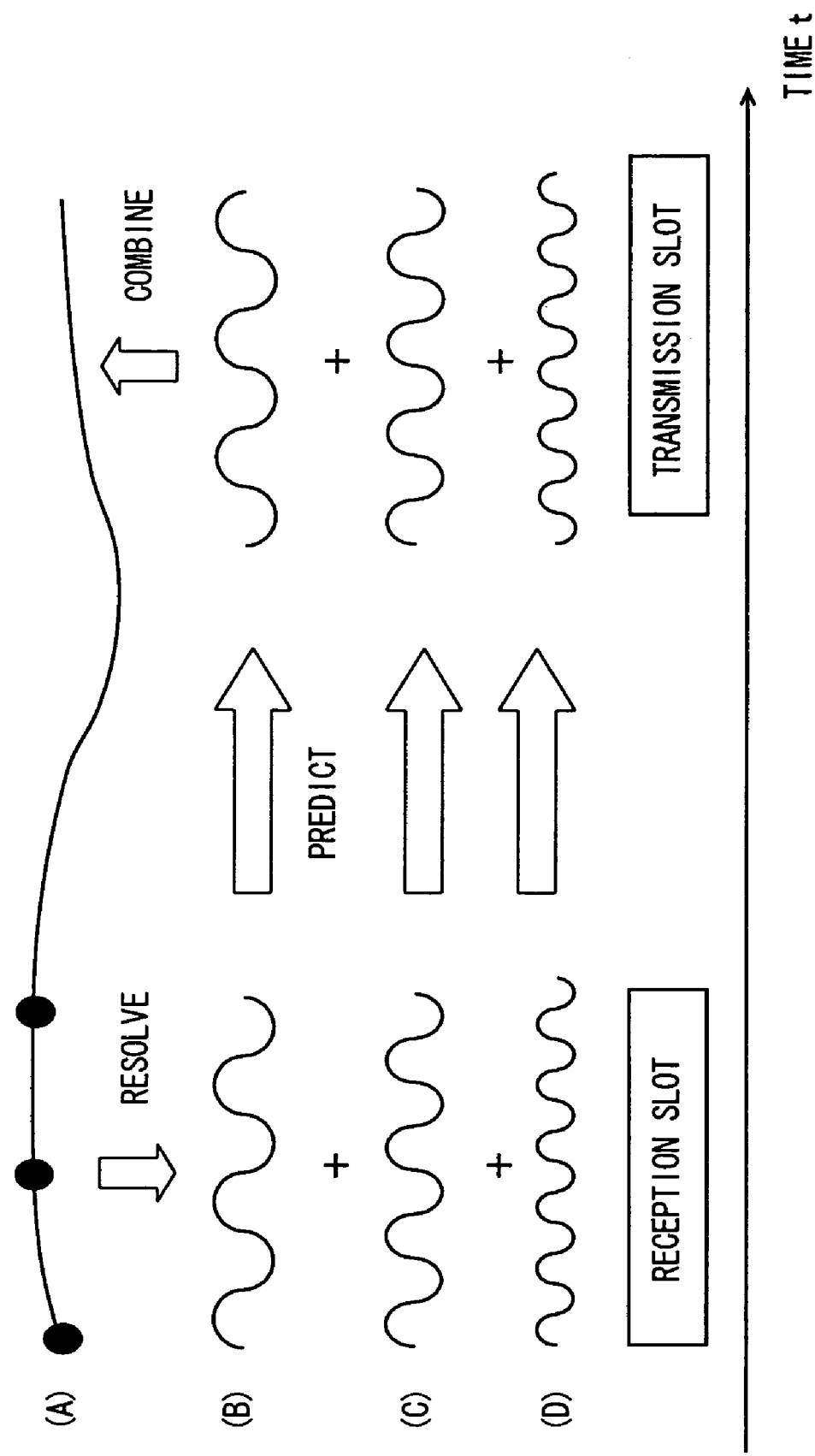
FIG. 2 is a conceptual view illustrating an estimation principle of a transmission response vector according to the present invention.

FIG. 2 is a conceptual view illustrating the estimation principle of the transmission response vector according to the present invention.

Referring to FIG. 2, (A) represents a waveform schematically showing a temporal change along the time base (the abscissa) of an element (coefficient) $h_i$ corresponding to an ith antenna among elements (coefficients) for respective antennas constituting reception response vector H. A function of temporal change of (A) in FIG. 2 can be regarded as a composite waveform of signal waveforms of some frequency components which are different from each another.

For example, in an example in FIG. 2, waveform (A) can be regarded as a composite waveform of a signal waveform (B) of a first frequency, a signal waveform (C) of a higher, second frequency, and a signal waveform (D) of a higher, third frequency.

More generally, when the function of temporal change $h_i(t)$ of the coefficient for each antenna of the reception response vector is considered as the composite waveform of a signal waveform $\cos(\omega_x t)$ of x types of prescribed frequency components which are different from each other, the function $h_i(t)$ is expressed in the following manner.

$$h_i(t) = A_{i,1}\cos(\omega_1 t) + A_{i,2}\cos(\omega_2 t) + \cdots + A_{i,x-1}\cos(\omega_{x-1}t) + A_{i,x}\cos(\omega_x t) \quad (3)$$

Here, if x frequencies $\omega_1$ to $\omega_x$ which are different from each other are predetermined, coefficients $A_{i,1}$ to $A_{i,x}$ can be estimated, because those coefficients are constants that do not change over time. If these coefficients $A_{i,1}$ to $A_{i,x}$ are estimated, an element in the transmission response vector at an arbitrary timing t in the transmission slot in the downlink can be obtained from $h_i(t)$ in the above equation (3).

An example of a method of estimating these coefficients $A_{i,1}$ to $A_{i,x}$ will now be described. A value of the function of temporal change $h_i(t)$ of each element in the reception response vector can directly be measured by reception response vector calculator 22 in a section of the reception slot (uplink).

The number of coefficients $A_{i,1}$ to $A_{i,x}$ is x. Therefore, when the value for the reception response vector is measured at M timings, which is equal to or larger than x, within the section in one slot in reception, M measurement values represented in the equations below will be obtained at respective M timings $t_1$ to $t_M$.

$$h_i(t_1) = A_{i,1}\cos(\omega_1 t_1) + A_{i,2}\cos(\omega_2 t_1) + \quad (4)$$
$$\ldots + A_{i,x-1}\cos(\omega_{x-1}t_1) + A_{i,x}\cos(\omega_x t_1)$$
$$h_i(t_2) = A_{i,1}\cos(\omega_1 t_2) + A_{i,2}\cos(\omega_2 t_2) + \ldots +$$
$$A_{i,x-1}\cos(\omega_{x-1}t_2) + A_{i,x}\cos(\omega_x t_2)$$
$$\ldots$$
$$h_i(t_M) = A_{i,1}\cos(\omega_1 t_M) + A_{i,2}\cos(\omega_2 t_M) +$$
$$\ldots + A_{i,x-1}\cos(\omega_{x-1}t_M) + A_{i,x}\cos(\omega_x t_M)$$

As described later, if the values for x frequencies $\omega_1$ to $\omega_x$ which are different from each other are predetermined to values having a prescribed relation with respect to the Doppler frequency FD detected with moving speed determination portion 36, the above equations (4) will be represented as simultaneous equations, having coefficients $A_{i,1}$ to $A_{i,x}$ as unknown quantity. As described above, if the number of measurement timings M of the reception response vector is equal to or larger than x, that is, the number of frequencies, coefficients $A_{i,1}$ to $A_{i,x}$ obtained in this manner will have proper solutions, and the values for coefficients $A_{i,1}$ to $A_{i,x}$ can be obtained by solving the simultaneous equations.

When the values for coefficients $A_{i,1}$ to $A_{i,x}$ are substituted in the equation of the function of temporal change $h_i(t)$ in the above equation (3), the value of the function of temporal change $h_i(t)$ of the coefficient of the ith antenna of the reception response vector can be obtained with respect to arbitrary time t, because the values for frequencies $\omega_1$ to $\omega_x$ are all known.

In particular, with respect to the timing t in the transmission slot of the downlink, by obtaining the function of temporal change $h_i(t)$, the reception response vector can be estimated at timing t. The estimated reception response vector is provided from transmission response vector estimator 40 to transmission weight vector calculator 30 as the transmission response vector.

Referring again to the conceptual view in FIG. 2, a process for calculating such a transmission response vector will now be described. In one reception slot in the uplink, as shown in the above equation (3), the function of temporal change of the reception response vector shown with (A) can be resolved to the signal waveform $\cos(\omega_1 t)$ of the prescribed, first frequency $\omega_1$ shown with (B), the signal waveform $\cos(\omega_2 t)$ of the prescribed, second frequency $\omega_2$ shown with (C), and the signal waveform $\cos(\omega_3 t)$ of the prescribed, third frequency $\omega_3$ shown with (D).

Respective coefficients $A_1$, $A_2$, $A_3$ of these three signal waveforms which do not change over time can be found by solving the simultaneous equations derived by obtaining a measurement value of function (A) at three timings within the reception slot, as described above. Consequently, functions (B), (C), (D) can be solved respectively.

Then, the time is moved ahead to an arbitrary timing t within the transmission slot. By predicting and combining the change of corresponding signal waves (B), (C), (D) at that time, the reception response vector corresponding to timing t in the transmission slot can be obtained.

As described above, in the method according to the embodiment of the present invention, the coefficient of the signal waveform is obtained for each frequency, the change of the signal waveform is predicted for each frequency by increasing time t, and the signal waveform at that time is combined. Thus, the reception response vector at time t is estimated.

It is to be noted that the method of obtaining the coefficient of the signal waveform (function) for each frequency is not limited to solving the simultaneous equations as described above. By repetitively performing operations using the well-known adaptive algorithms such as Wiener solution, RLS, LMS, or the like, coefficient A can be obtained with a variety of methods.

Such a processing is mainly carried out by transmission response vector estimator 40 in FIG. 1. FIG. 3 is a flowchart showing a method of controlling transmission directivity using such an estimation processing of the transmission response vector.

Referring to FIG. 3, initially at step S1, the propagation path is estimated by reception response vector calculator 22 in FIG. 1. Specifically, the reception response vector of the uplink is estimated.

Next, at step S2, moving speed determination portion 36 estimates the degree of fading, that is, the Doppler frequency FD, with the aforementioned method of determination.

Next, at step S3, transmission response vector estimator 40 in FIG. 1 determines a plurality of frequencies ω in accordance with the detected Doppler frequency FD with a method described later.

Next, at step S4, transmission response vector estimator 40 estimates the coefficient for each signal waveform of a plurality of frequencies ω determined at step S3, with a method described in conjunction with the equations (3) and (4). Thus, the propagation path of the downlink, that is, the transmission response vector, is estimated.

Finally, at step S5, transmission weight vector calculator 30 in FIG. 1 estimates the transmission weight based on the transmission response vector of the downlink determined at step S4 described above.

Next, a method of determining frequency co in accordance with the Doppler frequency FD at step S3 in FIG. 3 will be described.

First, the number x of frequencies ω is predetermined, in accordance with accuracy of the operation of an operation unit constituting transmission response vector estimator 40. In other words, if the number x is too large, the number of coefficients to be found will increase, the number of equations in the equation (4) will be large, and an amount of operation will be considerable. In an example described below, five types of frequencies $\omega_1$ to $\omega_5$ are assumed.

Figure 4:
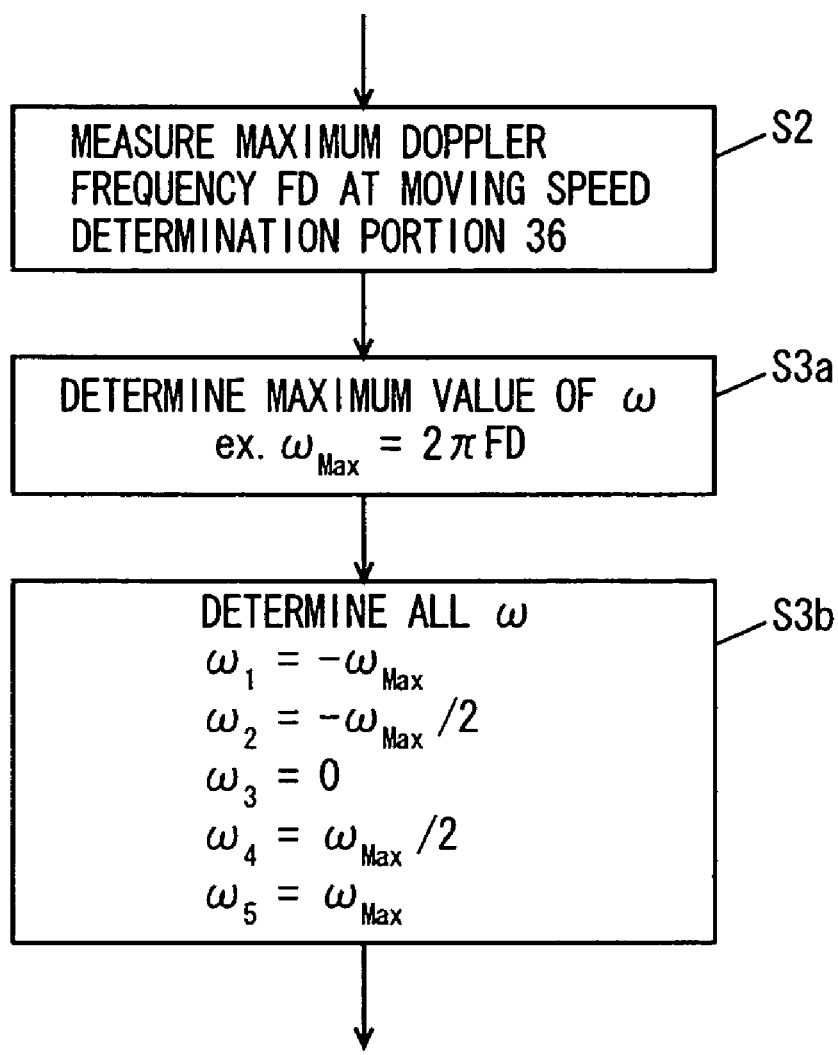
FIG. 4 is a flowchart showing a processing for determining a frequency component in a reception response vector in accordance with the Doppler frequency.

FIG. 4 is a flowchart showing a determination processing of a frequency component ω of the reception response vector in accordance with the Doppler frequency. In FIG. 4, step S2 corresponds to step S2 in FIG. 3, and moving speed determination portion 36 detects, in particular, the maximum value for the Doppler frequency FD.

Next steps S3a and S3b together correspond to step S3 in FIG. 3. First, at step S3a, $\omega_{MAX}$ which is the maximum value of ω is determined so as to have a prescribed relation with respect to the maximum value of FD. For example, it is assumed that $\omega_{MAX}$ is set to take a value 2π times of FD.

Next, at step S3b, $\omega_1$ to $\omega_5$ are set so as to have prescribed relations with respect to the above described $\omega_{MAX}$. For example, $\omega_1$ is set to $-\omega_{MAX}$, $\omega_2$ is set to $-\omega_{MAX}/2$, $\omega_3$ is set to 0, $\omega_4$ is set to $\omega_{MAX}/2$, and $\omega_5$ is set to $\omega_{MAX}$.

Here, in the above example, though $\omega_{MAX}$ has been set to attain $\omega_{MAX}=2\pi FD$, $\omega_{MAX}=2\pi(FD+F_{MARGIN})$ may be possible, with a certain margin.

If the Doppler frequency FD is lower than approximately 10 Hz, it is assumed that the terminal has hardly moved. If complicated calculation for estimating the transmission response vector as described above is performed by transmission response vector estimator 40 with respect to the terminal which has hardly moved, an error may be produced. With respect to the terminal which has not made a movement, it would be desirable to duplicate the reception response vector in reception as it is for use with control of transmission directivity.

Therefore, based on an FD determination result of moving speed determination portion 36, when the detected FD is lower than approximately 10 Hz, switch 38 selects the reception weight vector calculated by reception weight vector calculator 20, and provides the vector as it is to multipliers 15-1, 15-2, 15-3, 15-4 as the transmission weight vector.

On the other hand, if the detected FD is higher than approximately 10 Hz, switch 38 selects the transmission weight vector newly calculated by transmission weight vector calculator 30, and provides the vector to multipliers 15-1, 15-2, 15-3, 15-4.

Consequently, accurate and efficient control of transmission directivity in accordance with the Doppler frequency FD can be achieved.

In the above description, measurement of the reception response vector in order to obtain the simultaneous equations in the equation (4) has been performed by setting a necessary number of timings for solving the equation within one slot of the uplink. On the other hand, the timing for measuring the reception response vector does not have to be concentrated in one transmission slot, and alternatively, may be distributed in two or more transmission slots within the uplink.

By using the measurement value for the reception response vector at timings distributed in a plurality of transmission slots as described above, the estimation processing incorporating extensive fluctuation on the time base of the reception response vector can be achieved, and estimation accuracy of the transmission response vector can remarkably be improved.

As described above, in the method of controlling transmission directivity according to the embodiment of the present invention, the reception response vector is resolved to the signal waveform for each frequency to obtain the coefficient thereof, change of the signal waveform for each frequency is predicted by increasing time t, and the reception response vector at time t is estimated by combining the signal waveform at that time. In this manner, without causing an error due to an effect of fading as in the conventional extrapolation processing, the transmission response vector can be estimated, and accurate control of transmission directivity can be achieved. Specifically, as a result of computer simulation, even if the terminal moves with a high speed, such as a case in which the Doppler frequency FD exceeds approximately 100 Hz, it has been confirmed that spatial multiple access to the base station can be maintained.

As described above, according to the present invention, even if the terminal moves with a high speed, and the propagation environment fluctuates considerably, the transmission response vector in the downlink can accurately be estimated, and transmission directivity can sufficiently be implemented. This is achieved by regarding the estimated reception response vector as the composite waveform of the function of a plurality of frequencies, and by predicting and combining temporal change in the downlink for each function.

INDUSTRIAL APPLICABILITY

According to the present invention, accurate control of transmission directivity in the downlink is implemented. Therefore, the present invention is effective in a mobile communication system in which the terminal moves with a high speed, and the propagation environment fluctuates considerably.

The invention claimed is:

1. A radio base station system comprising:
   an adaptive antenna array including a plurality of antennas arranged in a discrete manner for transmitting and receiving signals to/from a plurality of terminals;
   a reception weight vector calculator which develops a weight vector for separating a signal from a specific terminal among said plurality of terminals, based on signals received with said plurality of antennas;
   a reception response vector predictor which develops a reception response vector of a propagation path from said specific terminal, based on signals received with said plurality of antennas;
   a transmission response vector calculator which develops a transmission response vector of said propagation path for transmission, based on said reception response vector; and
   a transmission directivity controller which controls transmission directivity of said antennas, based on said transmission response vector; wherein
   said transmission response vector predictor includes a vector predictor regarding a function of temporal change for each element of the reception response vector as a composite waveform of a plurality of periodic waveforms with frequency components which are different from each other, used to develop said transmission response vector at arbitrary timing positions in transmission.

2. The radio base station system according to claim 1, wherein
   said vector predictor includes
   a coefficient estimator which develops coefficients of the signal waveforms of said respective frequency components, and
   a calculator which develops said transmission response vector at the arbitrary timing position in transmission, based on said estimated coefficients and said prescribed frequency components.

3. The radio base station system according to claim 2, further comprising moving speed detecting means detecting a Doppler frequency representing a moving speed of said terminal, wherein said coefficient estimator determines said prescribed frequency components which are different from each other, in accordance with said detected Doppler frequency.

4. The radio base station system according to claim 3, wherein
said coefficient estimator determines said prescribed frequency components which are different from each other so as to have a prescribed relation with a maximum value for said detected Doppler frequency.

5. The radio base station system according to claim 3, wherein
said transmission directivity controller controls transmission directivity of said antenna, based on said weight vector calculated by said reception weight vector calculator instead of the estimation result of said transmission response vector calculator, when said detected Doppler frequency takes a value within a range indicating that said terminal has hardly moved.

6. The radio base station system according to claim 2, wherein
said coefficient estimator develops said coefficients by solving simultaneous equations having said coefficients as unknown quantity, obtained by estimating the reception response vector at timing positions in a number at least equal to a number of said frequency components which are different from each other.

7. The radio base station system according to claim 6, wherein
transmission and reception of said signal is performed in a time-divided manner in a plurality of time slots respectively, and
said coefficient estimator sets a timing position estimating said reception response vector in any one of the plurality of time slots for said reception.

8. The radio base station system according to claim 6, wherein
transmission and reception of said signal is performed in a time-divided manner in a plurality of time slots respectively, and
said coefficient estimator distributes and sets timing positions estimating said reception response vector in at least two slots among the plurality of time slots for said reception.

9. A method of controlling transmission directivity in a radio base station system, said system comprising an adaptive antenna array including a plurality of antennas arranged in a discrete manner for transmitting and receiving signals to/from a plurality of terminals, said method comprising the steps of:
developing a weight vector for separating a signal from a specific terminal among said plurality of terminals, based on signals received with said plurality of antennas;
developing a reception response vector of a propagation path from said specific terminal, based on signals received with said plurality of antennas;
developing a transmission response vector of said propagation path in transmission, based on said estimated reception response vector; and
controlling transmission directivity of said antennas, based on said estimated transmission response vector; wherein
said step of estimating said transmission response vector includes the steps of
regarding a function of temporal change of an element of each antenna of said estimated reception response vector as a composite waveform of signal waveforms of a prescribed number of prescribed frequency components which are different from each other,
predicting temporal changes at arbitrary timing positions in transmission, of the signal waveforms of respective frequency components, and
synthesizing said transmission response vector.

10. The method of controlling transmission directivity according to claim 9, wherein
said step of synthesizing includes the steps of
estimating coefficients of the signal waveforms of said respective frequency components, and
calculating said transmission response vector at the arbitrary timing position in transmission, based on said estimated coefficients and said prescribed frequency components.

11. The method of controlling transmission directivity according to claim 10, further comprising the step of detecting a Doppler frequency representing a moving speed of said terminal, wherein
said step of estimating said coefficient includes the step of determining said prescribed frequency components which are different from each other, in accordance with said detected Doppler frequency.

12. The method of controlling transmission directivity according to claim 11, wherein
said step of estimating said coefficient includes the step of determining said prescribed frequency components which are different from each other so as to have a prescribed relation with a maximum value for said detected Doppler frequency.

13. The method of controlling transmission directivity according to claim 11, wherein
said step of controlling transmission directivity of said antenna includes the step of controlling transmission directivity of said antenna, based on said calculated weight vector instead of said estimated transmission response vector, when said detected Doppler frequency takes a value within a range indicating that said terminal has hardly moved.

14. The method of controlling transmission directivity according to claim 10, wherein
said step of estimating said coefficient includes the step of estimating said coefficients by solving simultaneous equations having said coefficients as unknown quantity, obtained by estimating the reception response vector at timing positions in a number at least equal to a number of said frequency components which are different from each other.

15. The method of controlling transmission directivity according to claim 14, wherein
transmission and reception of said signal is performed in a time-divided manner in a plurality of time slots respectively, and
in said step of estimating said coefficient, a timing position estimating said reception response vector is set in any one of the plurality of time slots for said reception.

16. The method of controlling transmission directivity according to claim 14, wherein
transmission and reception of said signal is performed in a time-divided manner in a plurality of time slots respectively, and
in said step of estimating said coefficient, timing positions estimating said reception response vector are distributed and set in at least two slots among the plurality of time slots for said reception.

17. A computer readable storage medium containing a program which controls a radio base station system comprising a computer and an adaptive array including a plurality of antennas, which, when said program is executed, causes the computer to execute the steps of:

developing a weight vector for separating a signal from a specific terminal among said plurality of terminals, based on signals received with said plurality of antennas;

developing a reception response vector of a propagation path from said specific terminal, based on signals received with said plurality of antennas;

developing a transmission response vector of said propagation path in transmission, based on said estimated reception response vector; and controlling transmission directivity of said antennas, based on said estimated transmission response vector; wherein said step of estimating said transmission response vector includes the steps of regarding a function of temporal change of an element of each antenna of said estimated reception response vector as a composite waveform of signal waveforms of a prescribed number of prescribed frequency components which are different from each other, predicting temporal changes at arbitrary timing positions in transmission, of the signal waveforms of respective frequency components, and synthesizing said transmission response vector.

18. The computer readable storage medium according to claim 17, wherein said step of synthesizing includes the steps of estimating coefficients of the signal waveforms of said respective frequency components, and calculating said transmission response vector at the arbitrary timing position in transmission, based on said estimated coefficients and said prescribed frequency components.

19. The computer readable storage medium to claim 18, further causing the computer to execute the step of detecting a Doppler frequency representing a moving speed of said terminal, wherein said step of estimating said coefficient includes the step of determining said prescribed frequency components which are different from each other, in accordance with said detected Doppler frequency.

20. The computer readable storage medium according to claim 19, wherein said step of estimating said coefficient includes the step of determining said prescribed frequency components which are different from each other so as to have a prescribed relation with a maximum value for said detected Doppler frequency.

21. The computer readable storage medium according to claim 19, wherein said step of controlling transmission directivity of said antenna includes the step of controlling transmission directivity of said antenna, based on said calculated weight vector instead of said estimated transmission response vector, when said detected Doppler frequency takes a value within a range indicating that said terminal has hardly moved.

22. The computer readable storage medium according to claim 18, wherein said step of estimating said coefficient includes the step of estimating said coefficients by solving simultaneous equations having said coefficients as unknown quantity, obtained by estimating the reception response vector at timing positions in a number at least equal to a number of said frequency components which are different from each other.

23. The computer readable storage medium according to claim 22, wherein transmission and reception of said signal is performed in a time-divided manner in a plurality of time slots respectively, and in said step of estimating said coefficient, a timing position estimating said reception response vector is set in any one of the plurality of time slots for said reception.

24. The computer readable storage medium according to claim 22, wherein transmission and reception of said signal is performed in a time-divided manner in a plurality of time slots respectively, and in said step of estimating said coefficient, timing positions estimating said reception response vector are distributed and set in at least two slots among the plurality of time slots for said reception.

* * * * *